(12) United States Patent
Chen et al.

(10) Patent No.: US 9,143,752 B2
(45) Date of Patent: Sep. 22, 2015

(54) METHOD AND ELECTRONIC SYSTEM FOR PLAYING VIDEOS

(71) Applicant: WISTRON CORP., New Taipei (TW)

(72) Inventors: Yu-Ping Chen, New Taipei (TW); Hsing-Yu Pao, New Taipei (TW)

(73) Assignee: Wistron Corp., New Taipei (TW)

( * ) Notice: Subject to any disclaimer, the term of this patent is extended or adjusted under 35 U.S.C. 154(b) by 125 days.

(21) Appl. No.: 13/944,832

(22) Filed: Jul. 17, 2013

(65) Prior Publication Data
US 2014/0050453 A1     Feb. 20, 2014

(30) Foreign Application Priority Data

Aug. 16, 2012  (TW) .............................. 101129668 A

(51) Int. Cl.
*H04N 5/775* (2006.01)
*H04N 9/87* (2006.01)
*G11B 31/00* (2006.01)
*H04N 5/76* (2006.01)

(52) U.S. Cl.
CPC ................ *H04N 9/87* (2013.01); *G11B 31/006* (2013.01); *H04N 5/76* (2013.01)

(58) Field of Classification Search
CPC ........... H04N 9/87; H04N 5/76; G11B 31/006
USPC ........................................... 386/230
See application file for complete search history.

(56) References Cited

U.S. PATENT DOCUMENTS

| | | | |
|---|---|---|---|
| 5,613,135 A * | 3/1997 | Sakai et al. ...................... 710/62 |
| 7,199,857 B2 | 4/2007 | Paige et al. | |
| 2004/0135772 A1* | 7/2004 | Kao et al. ....................... 345/168 |
| 2007/0162875 A1* | 7/2007 | Paquette et al. ................ 715/847 |
| 2010/0014003 A1 | 1/2010 | Chang | |
| 2011/0069933 A1 | 3/2011 | Tsai et al. | |
| 2011/0271202 A1* | 11/2011 | Wong et al. .................... 715/752 |

OTHER PUBLICATIONS

Taiwan Patent Office, Office Action, Patent Application Serial No. 101129668, Jan. 28, 2015, Taiwan.

* cited by examiner

*Primary Examiner* — William Tran

(57) ABSTRACT

A method for playing videos, applied to an electronic system, is provided. A video is played through a player application program, and a playing status stored in an embedded control random access memory of a keyboard controller of the electronic system is set to a first status when the video is played. Then, all light signals of the electronic system are turned off by the keyboard controller according to the first status.

7 Claims, 8 Drawing Sheets

METHOD AND ELECTRONIC SYSTEM FOR PLAYING VIDEOS

CROSS REFERENCE TO RELATED APPLICATIONS

This application claims priority of Taiwan Patent Application No. 101129668, filed on Aug. 16, 2012, the entirety of which is incorporated by reference herein.

BACKGROUND OF THE INVENTION

1. Field of the Invention

The invention relates to a method for playing videos, and more particularly to a user-friendly method for playing videos.

2. Description of the Related Art

Electronic devices that are capable of playing multimedia like a video, such as a desktop computer, a mobile multimedia device disclosed in Taiwan Patent Publication No. 201006160 (Application No. 097127436) or a display device with playback functionality disclosed in Taiwan Patent Publication No. 201112237 (Application No. 098131530), are main streams in recent years. However, when an electronic device plays a video, such as a movie, light signals of the electronic device may affects user's visual effect when watching the video on the electronic device, thereby causing user's inconvenience in watching the video.

BRIEF SUMMARY OF THE INVENTION

In view of this, the invention provides a method and an electronic system to automatically turn off all light signals of an electronic device when the electronic device plays a video so as to avoid affecting user's visual effect.

An embodiment of the invention provides a method for playing videos, applied to an electronic system, comprising: playing a video through a player application program; setting a playing status stored in an embedded control random access memory (ECRAM) of a keyboard controller (KBC) of the electronic system to a first status; and turning off all light signals of the electronic system by the KBC according to the first status.

Another embodiment of the invention provides an electronic system for playing videos, comprising: a display unit; a processing unit, coupled to the display unit, comprising a player module, wherein the player module plays a video on the display unit; at least one light signal; and a keyboard controller (KBC), coupled to the processing unit and the at least one light signal, comprising an embedded control random access memory (ECRAM), wherein the ECRAM stores a playing status, wherein when the video is played, the playing status is a first status, and the KBC turns off the at least one light signal according to the first status, and wherein when the video is paused or stopped, the playing status is a second status, and the KBC turns on turned-off one(s) of the at least one light signal according to the second status.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
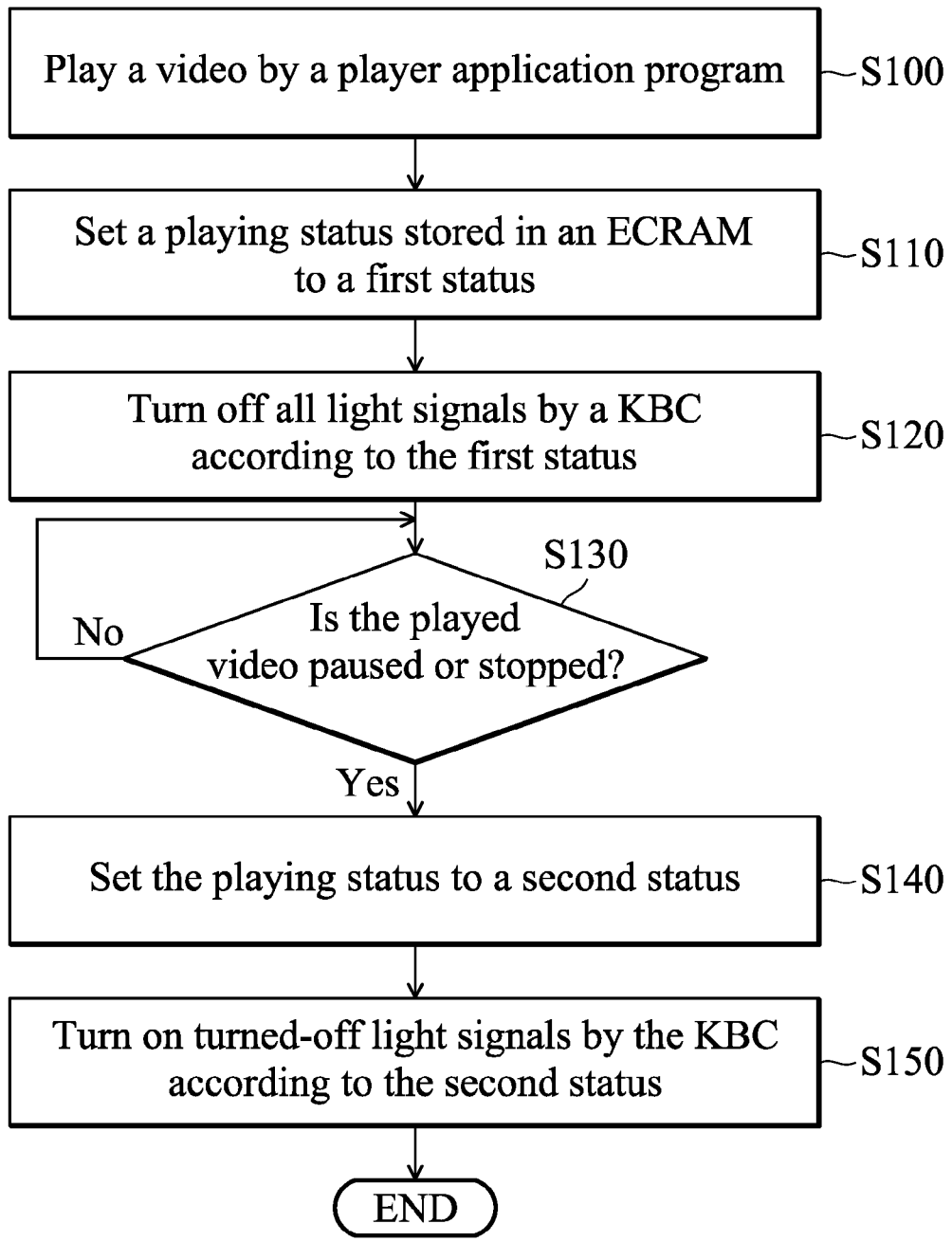
FIG. 1 is a flowchart of a method for playing videos according to an embodiment of the invention.

This description is made for the purpose of illustrating the general principles of the invention and should not be taken in a limiting sense. In addition, the present disclosure may repeat reference numerals and/or letters in the various examples. This repetition is for the purpose of simplicity and clarity and does not in itself dictate a relationship between the various embodiments and/or configurations discussed. The scope of the invention is best determined by reference to the appended claims.

It is understood that the following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact.

FIG. 1 is a flowchart of a method for playing videos applied to an electronic system according to an embodiment of the invention. In step S100, a player application program, such as Windows Media Player, is executed on the electronic system to play a video. Next, in step S110, a playing status stored in an embedded control random access memory (ECRAM) of a keyboard controller (KBC) of the electronic system is set to a first status. The playing status stored in the ECRAM corresponds to a video playing status of the player application program. When the player application program plays the video, the playing status is set to the first status. On the other hand, when the played video is paused or stopped by the player application program, the playing status is set to a second status. The KBC may obtain the video playing status of the player application program from the set playing status stored in the ECRAM of the KBC. In step S120, the KBC turns off all light signals (such as LED (light emitting diode) lights of a keyboard, light signals of a hard disc driver, light signals surrounding a display screen, and so on) of the electronic system according to the first status of the playing status. Herewith, when the electronic system plays the video through the player application program, all light signals of the electronic system are automatically turned off, and thus the light signals may not affect user's visual effect when watching the video on the electronic system.

Next, in step S130, whether or not the played video is paused or stopped is determined. If the played video keeps being played (step S130: No), the method proceeds back to step S130 and keeps monitoring whether or not the played video is paused or stopped. If the played video is paused or stopped (step S130: Yes), the playing status stored in the ECRAM of the KBC is set to the second status in step S140. Then, in step S150, the KBC turns on light signals of the electronic system that were previously turned off according to the second status of the playing status. Herewith, when the played video is paused or stopped, turned-off ones of all light signals of the electronic system are automatically turned on, and thus it is convenient for the user to operate the electronic system when not watching videos.

In an example, the playing status stored in the ECRAM of the KBC can be a flag. When the value of the playing status is '0', the playing status is the first status. When the value of the playing status is '1', the playing status is the second status. The KBC may access the playing status stored in the ECRAM and control turning on and off of all light signals according to the accessed playing status.

Embodiments of the method for playing videos will be explained in the following with reference to FIG. 2A~2B, FIG. 3A~3B and FIG. 4A~4B. In FIG. 2A~2B, FIG. 3A~3B and FIG. 4A~4B, steps that are similar to those in FIG. 1 are identified by similar numerals, such as step S100 and steps S200, S300 and S400.

Figure 2A:
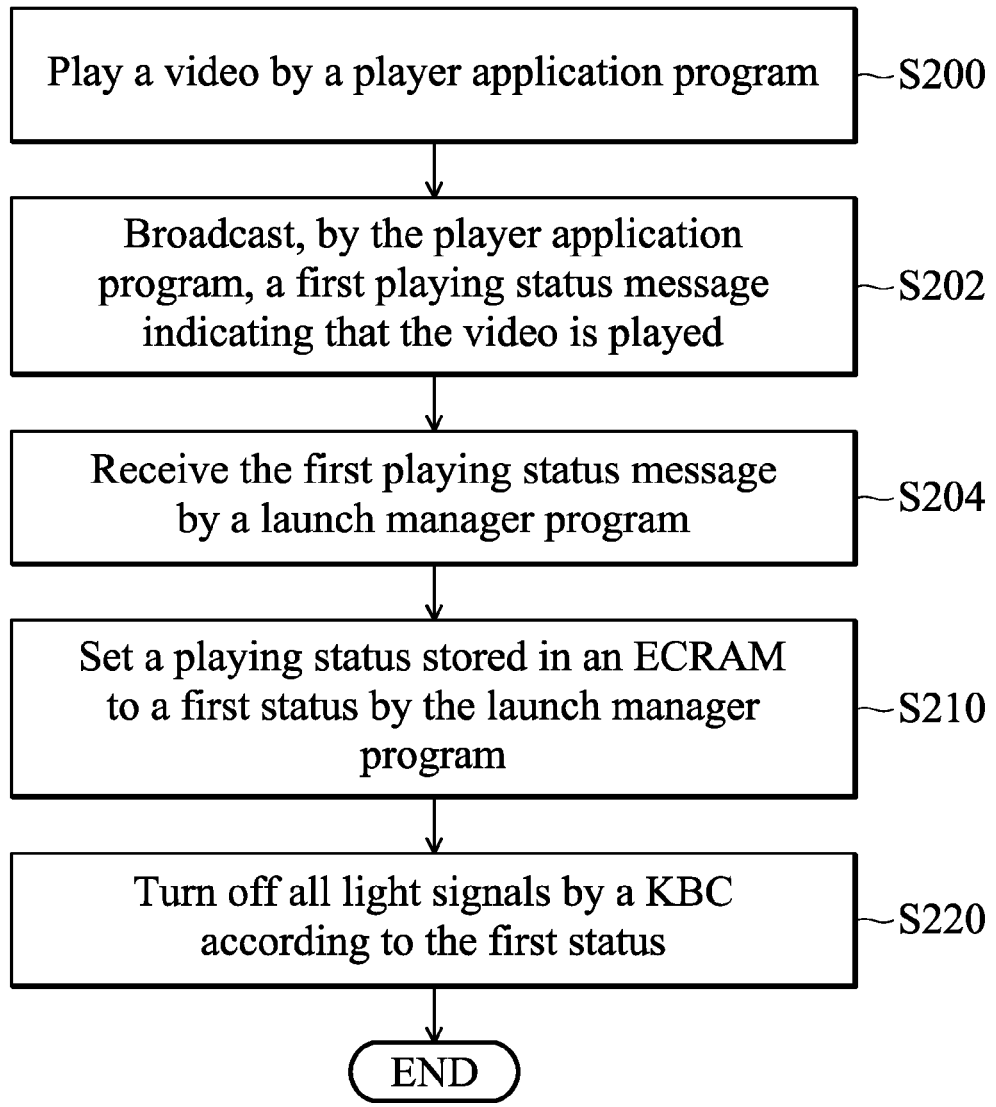
FIG. 2A and FIG. 2B are flowcharts of a method for playing videos according to an embodiment of the invention.
Figure 2B:
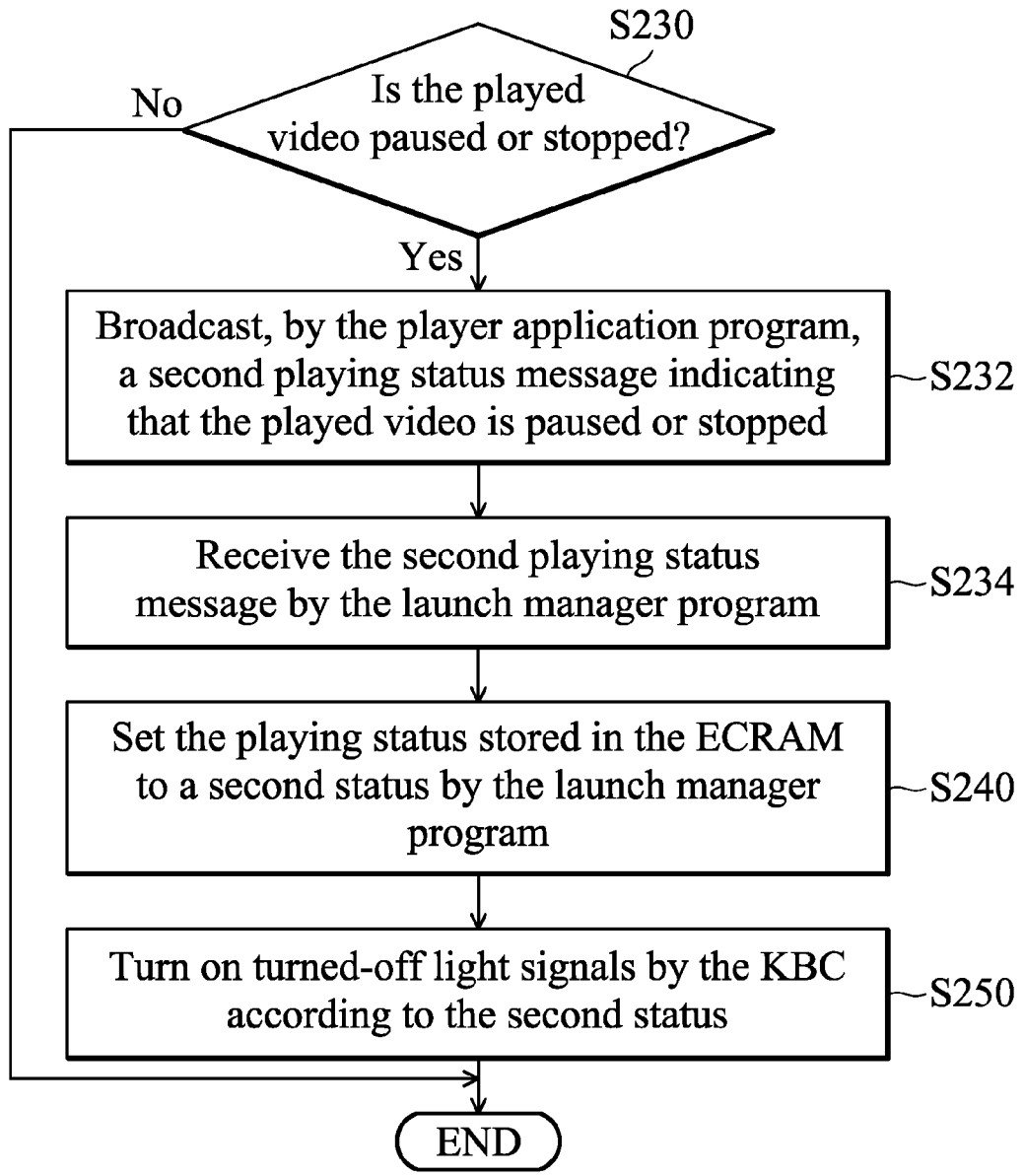

FIG. 2A and FIG. 2B are flowcharts of a method for playing videos according to an embodiment of the invention, wherein FIG. 2A illustrates a flowchart applied to a case where a video is played and FIG. 2B illustrates a flowchart applied to a case where the played video is paused or stopped. As shown in FIG. 2A, firstly, in step S200, a player application program, such as Windows Media Player, is executed on an electronic system to play a video. In step S202, the player application program broadcasts a first playing status message to notify other programs or hardware components of the electronic system that the video is played. In step S204, a launch manager program receives the first playing status message broadcasted by the player application program. In step S210, the launch manager program sets a playing status stored in an ECRAM of a KBC of the electronic system to a first status according to the first playing status message. As described above, the first status indicates that the player application program is playing the video. Therefore, in step S220, the KBC turns off all light signals of the electronic system according to the first status of the playing status.

In FIG. 2B, whether or not the played video is paused or stopped is determined in step S230. If the played video is not paused or stopped (step S230: No), the flowchart applied to the case where the played video is paused or stopped ends. If the played video is paused or stopped (step S230: Yes), in step S232, the player application program broadcast a second playing status message to notify other programs or hardware components of the electronic system that the played video is paused or stopped. In step S234, the launch manager program receives the second playing status message broadcasted by the player application program. In step S240, the launch manager program sets the playing status stored in the ECRAM of the KBC to a second status according to the second playing status message. As described above, the second status indicates that the played video is paused or stopped by the player application program. Therefore, in step S250, the KBC turns on light signals of the electronic system that were previously turned off according to the second status of the playing status.

Figure 3A:
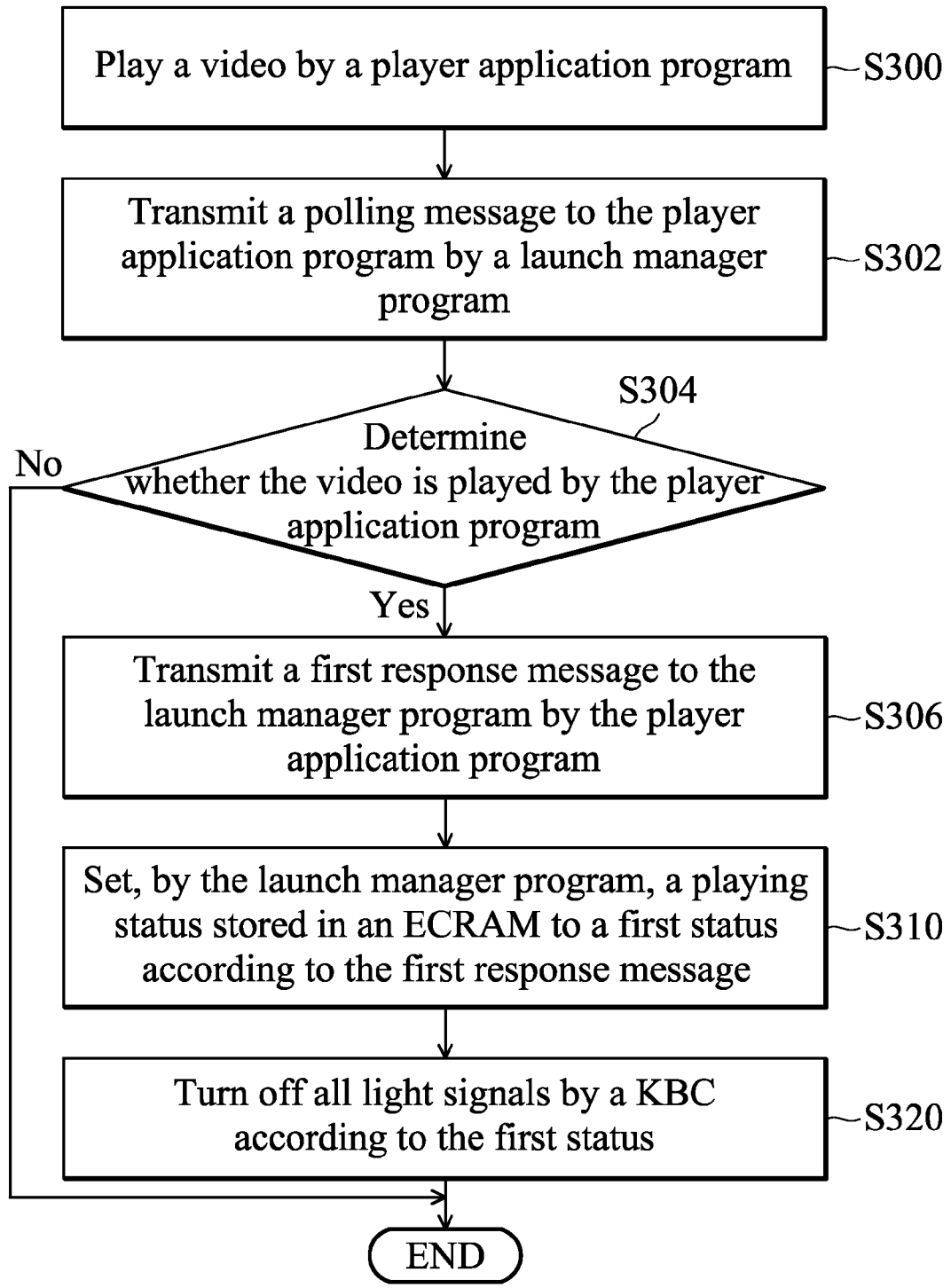
FIG. 3A and FIG. 3B are flowcharts of a method for playing videos according to an embodiment of the invention.
Figure 3B:
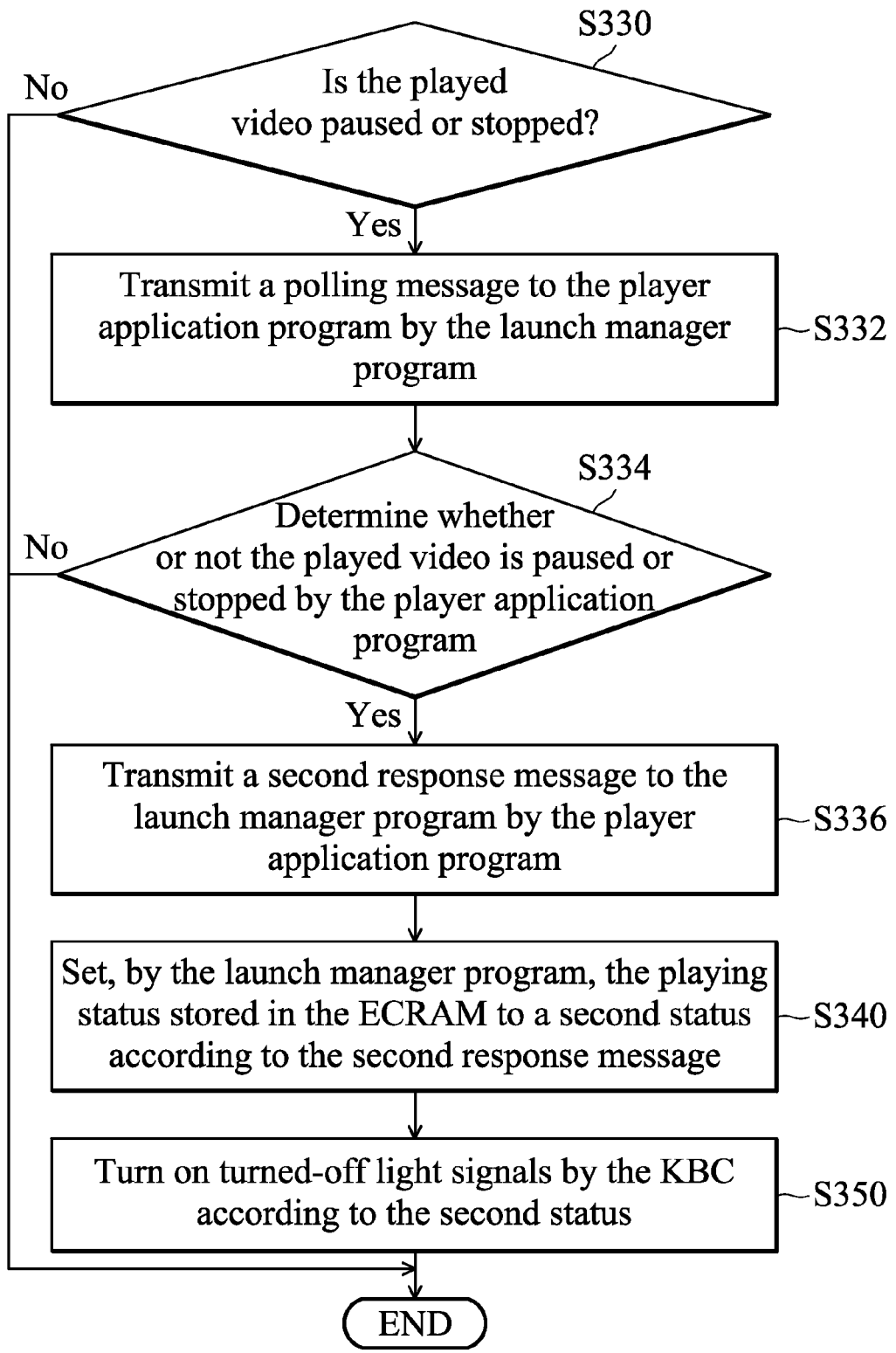

FIG. 3A and FIG. 3B are flowcharts of a method for playing videos according to another embodiment of the invention, wherein FIG. 3A illustrates a flowchart applied to a case where a video is played and FIG. 3B illustrates a flowchart applied to a case where the played video is paused or stopped. As shown in FIG. 3A, firstly, in step S300, a player application program is executed on an electronic system to play a video. In step S302, a launch manager program transmits a polling message to the player application program to inquire whether there is a video being played by the player application program. When the player application program receives the polling message transmitted by the launch manager program, the player application program determines whether the video is played in step S304. If the video is played (step S304: Yes), in step S306, the player application program transmits a first response message to the launch manager program to response to the polling message. Then, in step S310, the launch manager program sets a playing status stored in an ECRAM of a KBC of the electronic system to a first status according to the first response message. In step S320, the KBC turns off all light signals of the electronic system according to the first status.

In FIG. 3B, whether or not the played video is paused or stopped is determined in step S330. If the played video is not paused or stopped (step S330: No), the flowchart applied to the case where the played video is paused or stopped ends. If the played video is paused or stopped (step S330: Yes), in step S332, the launch manager program transmits a polling message to the player application program to inquire whether or not the played video is paused or stopped. When the player application program receives the polling message transmitted by the launch manager program, the player application program determines whether or not the played video is paused or stopped in step S334. If the played video is paused or stopped (step S334: Yes), in step S336, the player application program transmits a second response message to the launch manager program to response to the polling message. Then, in step S340, the launch manager program sets the playing status stored in the ECRAM of the KBC to a second status according to the second response message. In step S350, the KBC turns on light signals of the electronic system that were previously turned off according to the second status.

In an example, the launch manager program described above is activated and executed when the electronic system is turned on. The launch manager program is used to control functions of hotkeys, turning on and off of function modules (such as a Bluetooth module), and so on. For example, when a hotkey on a keyboard coupled to the KBC is pressed, the launch manager program activates application programs or hardware components that correspond to the hotkey.

Figure 4A:
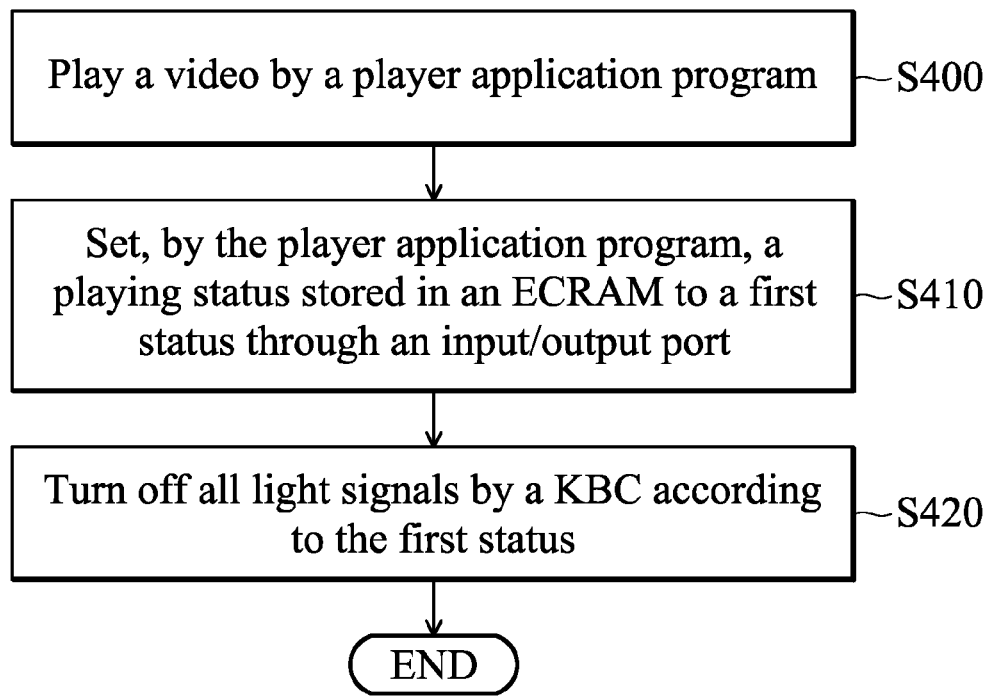
FIG. 4A and FIG. 4B are flowcharts of a method for playing videos according to an embodiment of the invention.
Figure 4B:
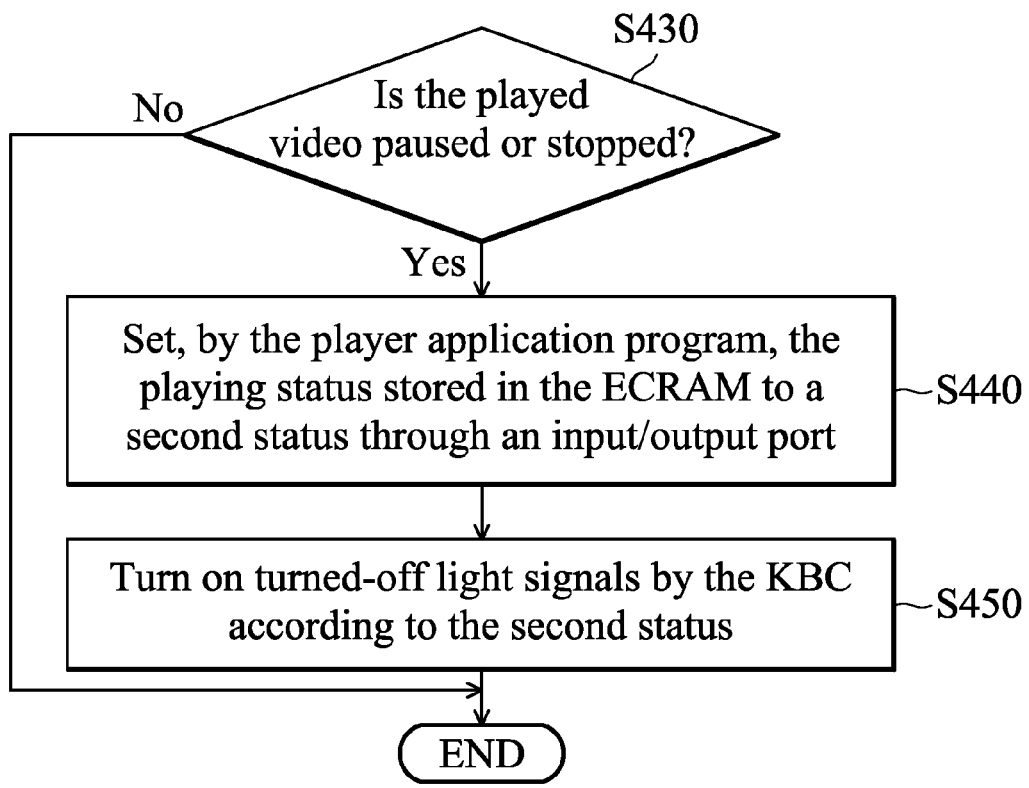

FIG. 4A and FIG. 4B are flowcharts of a method for playing videos according to still another embodiment of the invention, wherein FIG. 4A illustrates a flowchart applied to a case where a video is played and FIG. 4B illustrates a flowchart applied to a case where the played video is paused or stopped. As shown in FIG. 4A, firstly, in step S400, a player application program is executed on an electronic system to play a video. Then, in step S410, the player application program sets a playing status stored in an ECRAM of a KBC of the electronic system to a first status directly through an input/output port of the KBC. In step S420, the KBC turns off all light signals of the electronic system according to the first status.

In FIG. 4B, whether or not the played video is paused or stopped is determined in step S430. If the played video is not paused or stopped (step S430: No), the flowchart applied to the case where the played video is paused or stopped ends. If the played video is paused or stopped (step S430: Yes), in step S440, the player application program sets the playing status stored in then ECRAM of the KBC to a second status directly through the input/output port of the KBC. In step S450, the KBC turns on light signals of the electronic system that were previously turned off according to the second status.

Figure 5:
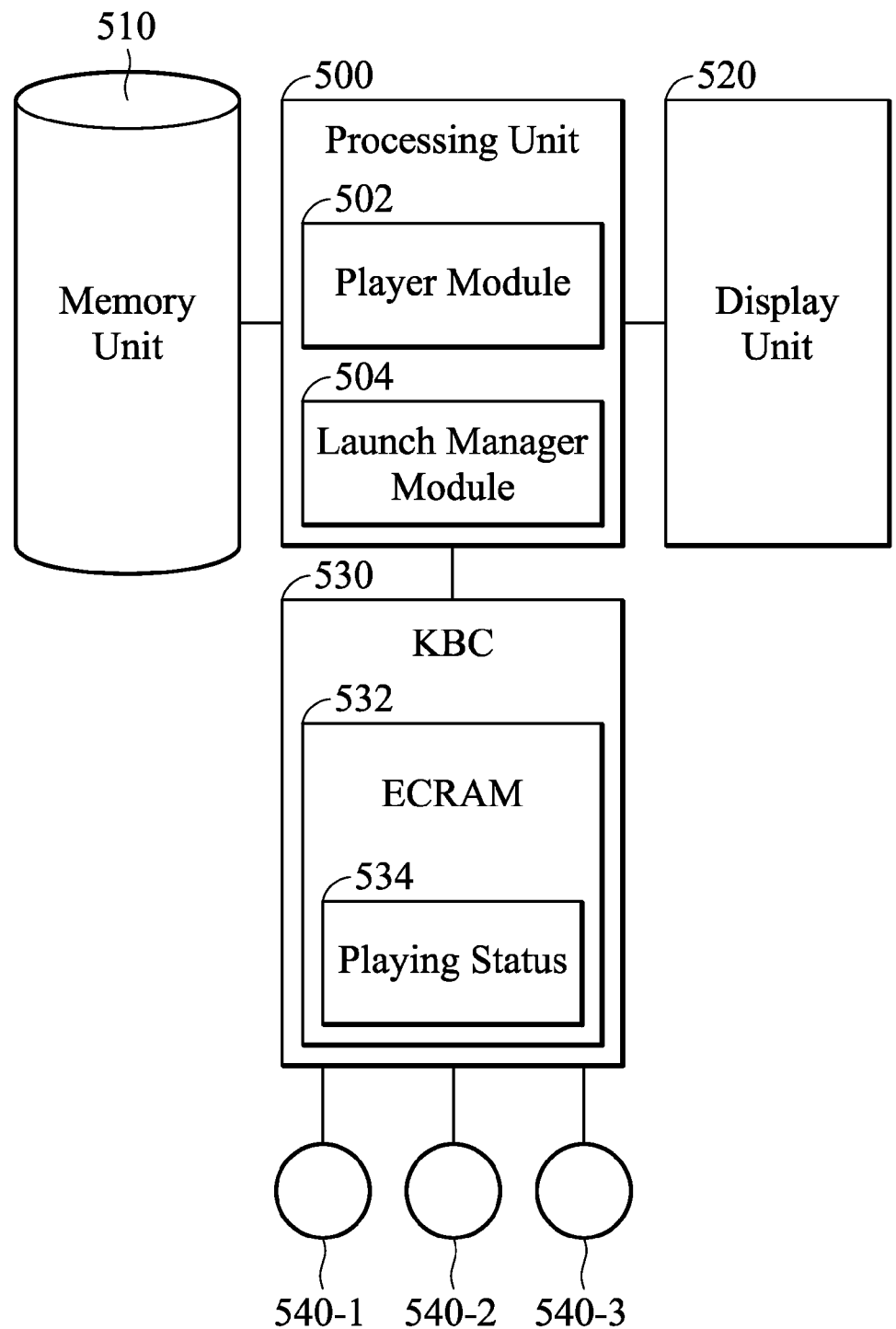
FIG. 5 is a block diagram of an electronic system for playing videos according to an embodiment of the invention.

FIG. 5 is a block diagram of an electronic system for playing videos according to an embodiment of the invention. The electronic system at least comprises a processing unit 500, a memory unit 510, a display unit 520, a KBC 530 and light signals 540-1, 540-2 and 540-3. The processing unit 500 is coupled to the memory unit 510, the display unit 520 and the KBC 530. The processing unit 500 comprises a player module 502 and a launch manager module 504. The processing unit 500 can be a microprocessor or a central processing unit. Program codes stores in the memory unit 510 is loaded into and executed by the processing unit 500 to realize function modules. For example, a player application program stored in the memory unit 510 is loaded into and executed by the processing unit 500 to realize the player module 502 so as to play a video on the display unit 520. For example, once the electronic system is turned on, a launch manager program stored in the memory unit 510 is loaded into and executed by the processing unit 500 to realize the launch manager module 504 so as to control functions of hotkeys, turning on and off of function modules (such as a Bluetooth module), and so on. For example, when a hotkey on a keyboard (not shown) coupled to the KBC 530 is pressed, the launch manager module 504 activates application programs or hardware components that correspond to the pressed hotkey. The function modules described in the disclosure can also be realized by separate devices, specific integrated circuits, processors that perform appropriate software, or any combination thereof.

The KBC 530 is coupled to the processing unit 500. In addition, the KBC 530 is coupled to the light signals 540-1, 540-2 and 540-3 of the electronic system via general purpose input/output (GPIO) ports so as to control turning on and off of the light signals 540-1, 540-2 and 540-3. Light signals 540-1, 540-2 and 540-3 are, for example, LED lights on the keyboard, light signals of a hard disc driver, light signals surrounding a display screen, and so on. For the sake of simplicity and clarity, there are only 3 light signals in FIG. 5, but the invention is not limited thereto. The KBC 530 further comprises an ECRAM 532. The ECRAM 532 stores a playing status 534. The playing status 534 indicates whether the electronic system plays a video or not. For example, the playing status 534 can be a flag. The KBC 530 can obtain whether the electronic system plays a video or not by accessing the playing status 534 stored in the ECRAM 532 and control turning on and off of the light signals 540-1, 540-2 and 540-3 according to the accessed playing status 534. In the embodiment, when the player module 502 plays a video, the playing status 534 is a first status. For example, the value of the playing status 534 is '0'. Then the KBC 530 turns off the light signals 540-1, 540-2 and 540-3 according to the first status. On the other hand, when the played video is paused or stopped by the player module 502, the playing status 534 is a second status. For example, the value of the playing status 534 is '1'. Then the KBC turns on turned-off one(s) of the light signals 540-1, 540-2 and 540-3 according to the second status. For example, when the player module 502 plays a movie, the light signals 540-1, 540-2 and 540-3 are turned off so as to avoid affecting user's visual effect. When the movie finishes or when the user presses a pause key, the turned-off light signals 540-1, 540-2 and 540-3 are turned on again, and thus it is convenient for the user to perform other operations. Three embodiments will be illustrated below to explain how to set the playing status 534 according to a video playing status of the electronic system.

In an embodiment, when the player module 502 plays the video, the player module 502 broadcasts a first playing status message indicating the video is played. The launch manager module 504 receives the first playing status message broadcasted by the player module 502 and sets the playing status 534 to a first status according to the first playing status message. When the played video is paused or stopped by the player module 502, the player module 502 broadcasts a second playing status message indicating the played video is paused or stopped. The launch manager module 504 receives the second playing status message broadcasted by the player module 502 and sets the playing status 534 to a second status according to the second playing status message.

In another embodiment, the launch manager module 504 obtains a video playing status of the electronic system, such as whether the electronic system is playing a video, or whether or not the played video is paused or stopped by the electronic system, through polling. In the embodiment, after the player module 502 plays a video, the launch manager module 504 transmits a polling message to the player module 502. After receiving the polling message, the player module 502 responses to the polling message according to the current video playing status of the electronic system. For example, after receiving the polling message, the player module 502 determines whether the video is being played. If the determination result is yes, thereby indicating that the player module 502 is playing the video, the player module 502 transmits a first response message to the launch manager module 504. The launch manager module 504 sets the playing status 534 to a first status according to the first response message. During the period that the player module 502 plays the video, if the played video is paused or stopped by the player module 502, the launch manager module 504 transmits a polling message to the player module 502. After receiving the polling message, the player module 502 responses to the polling message according to the current video playing status of the electronic system. For example, after receiving the polling message, the player module 502 determines whether or not the played video is paused or stopped. If the played video is paused or stopped, the player module 502 transmits a second response message to the launch manager module 504. The launch manager module 504 sets the playing status 534 to a second status according to the second response message. In an example, the launch manager 504 can periodically transmit a polling message to the player module 502 to monitor the current video playing status of the player module 502.

In another embodiment, when the player module 502 plays a video, the player module sets the playing status 534 to a first status directly through an input/output port (not shown) of the KBC 530. When the played video is paused or stopped by the player module 502, similarly, the player module 502 sets the playing status 534 to a second status directly through the input/output port of the KBC 530.

As described above, in the invention, a playing status stored in an ECRAM of a KBC is correspondingly set according to whether a video playing electronic system is playing a video or whether or not the played video is paused or stopped by the video playing electronic system. The KBC can obtain the video playing status of the video playing electronic system from the playing status and control turning on and off of all light signals of the video playing electronic system. Therefore, when the video playing electronic system plays a video, the KBC can turn off all light signals so as to avoid affecting user's visual effect when watching the video. When the played video is paused or stopped by the video playing electronic system, the KBC can turn on turned-off light signals of the video playing electronic system again.

Methods and systems of the present disclosure, or certain aspects or portions of embodiments thereof, may take the form of a program code (i.e., instructions) embodied in media, such as floppy diskettes, CD-ROMS, hard drives, firmware, or any other non-transitory machine-readable storage medium, wherein, when the program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by ways of examples and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for playing videos, applied to an electronic system, comprising:
   playing a video through a player application program;
   setting a playing status stored in an embedded control random access memory (ECRAM) of a keyboard controller (KBC) of the electronic system to a first status when playing the video;
   turning off all light signals of the electronic system by the KBC according to the first status;
   when the video is paused or stopped by the electronic system through the player application program, setting the playing status stored in the ECRAM to a second status and turning on previously turned-off one(s) of the light signals by the KBC according to the second status;
   wherein when the electronic system plays the video through the player application program, the player application program broadcasts a first playing status message indicating the video is played, and a launch manager program receives the first playing status message and sets the playing status to the first status;
   wherein when the video is paused or stopped by the electronic system through the player application program, the player application program broadcasts a second playing status message indicating the video is paused or stopped, and the launch manager program receives the second playing status message and sets the playing status to the second status.

2. The method as claimed in claim 1, wherein when the electronic system plays the video through the player application program, the player application program sets the playing status to the first status through an input/output port of the KBC.

3. The method as claimed in claim 2, wherein when the video is paused or stopped by the electronic system through the player application program, the player application program sets the playing status to the second status through the input/output port of the KBC.

4. The method as claimed in claim 1, wherein the KBC controls all of the light signals of the electronic system via general purpose input/output ports.

5. An electronic system for playing videos, comprising:
   a display unit;
   a processing unit, coupled to the display unit, comprising a player module, wherein the player module plays a video on the display unit;
   at least one light signal; and
   a keyboard controller (KBC), coupled to the processing unit and the at least one light signal, comprising an embedded control random access memory (ECRAM), wherein the ECRAM stores a playing status,
   wherein when the video is played, the playing status is a first status, and the KBC turns off all of the light signals of the electronic system according to the first status, and
   wherein when the video is paused or stopped, the playing status is a second status, and the KBC turns on the turned-off light signals according to the second status;
   wherein the processing unit further comprises a launch manager module, when the player module plays the video, the player module broadcasts a first playing status message indicating the video is played and the launch manager module receives the first playing status message and sets the playing status to the first status, and wherein when the video is paused or stopped by the player module, the player module broadcasts a second playing status message indicating the video is paused or stopped and the launch manager module receives the second playing status message and sets the playing status to the second status.

6. The electronic system as claimed in claim 5, wherein when the player module plays the video, the player module sets the playing status to the first status through an input/output port of the KBC, and when the video is paused or stopped by the player module, the player module sets the playing status to the second status through the input/output port of the KBC.

7. The electronic system as claimed in claim 5, wherein the KBC controls all of the light signals of the electronic system via general purpose input/output ports.

* * * * *